United States Patent

Griffith

[15] 3,699,302
[45] Oct. 17, 1972

[54] SINGLE TURN CHANNEL COIL

[72] Inventor: Richard A. Griffith, Garden Grove, Calif.

[73] Assignee: Park-Ohio Industries, Inc., Cleveland, Ohio

[22] Filed: Feb. 24, 1971

[21] Appl. No.: 117,931

[52] U.S. Cl. ..........219/10.57, 219/10.71, 219/10.79
[51] Int. Cl. ..............................................H05b 5/18
[58] Field of Search..219/10.57, 10.69, 10.71, 10.79, 219/10.41, 10.43, 10.75

[56] References Cited

UNITED STATES PATENTS

| | | | |
|---|---|---|---|
| 2,620,432 | 12/1952 | Foxx | 219/10.71 X |
| 3,251,976 | 5/1966 | McBrien | 219/10.69 |
| 3,562,470 | 2/1971 | Bobart | 219/10.69 X |
| 3,446,930 | 5/1969 | Seulen et al. | 219/10.79 X |

Primary Examiner—J. V. Truhe
Assistant Examiner—B. A. Reynolds
Attorney—Meyer, Tilberry and Body

[57] ABSTRACT

A method and apparatus for inductively heating at least a portion of the length of an elongated workpiece wherein the inductor includes a pair of parallel spaced apart conductors interconnected at one end so as to define a workpiece pass. The conductors are angularly disposed coplanar with the pass so that the workpiece is progressively preheated as it travels therethrough. Spaced from the exit area of these heating conductors is a uniforming heating conductor extending transversely around the direction of the pass over at least that portion of the element which has been progressively preheated. To provide efficient and uniform heating, the width of the uniforming heating conductor is maintained between one to one and a half times the thickness of the element. A relationship of less than this will not provide simultaneous uniforming heating for a workpiece and a relationship of greater than this decreases the flux density such that increased electrical energy is required as well as undesirably heating the adjacent workpiece.

7 Claims, 4 Drawing Figures

INVENTOR.
RICHARD A. GRIFFITH
BY
Meyer, Tilberry & Body
ATTORNEYS

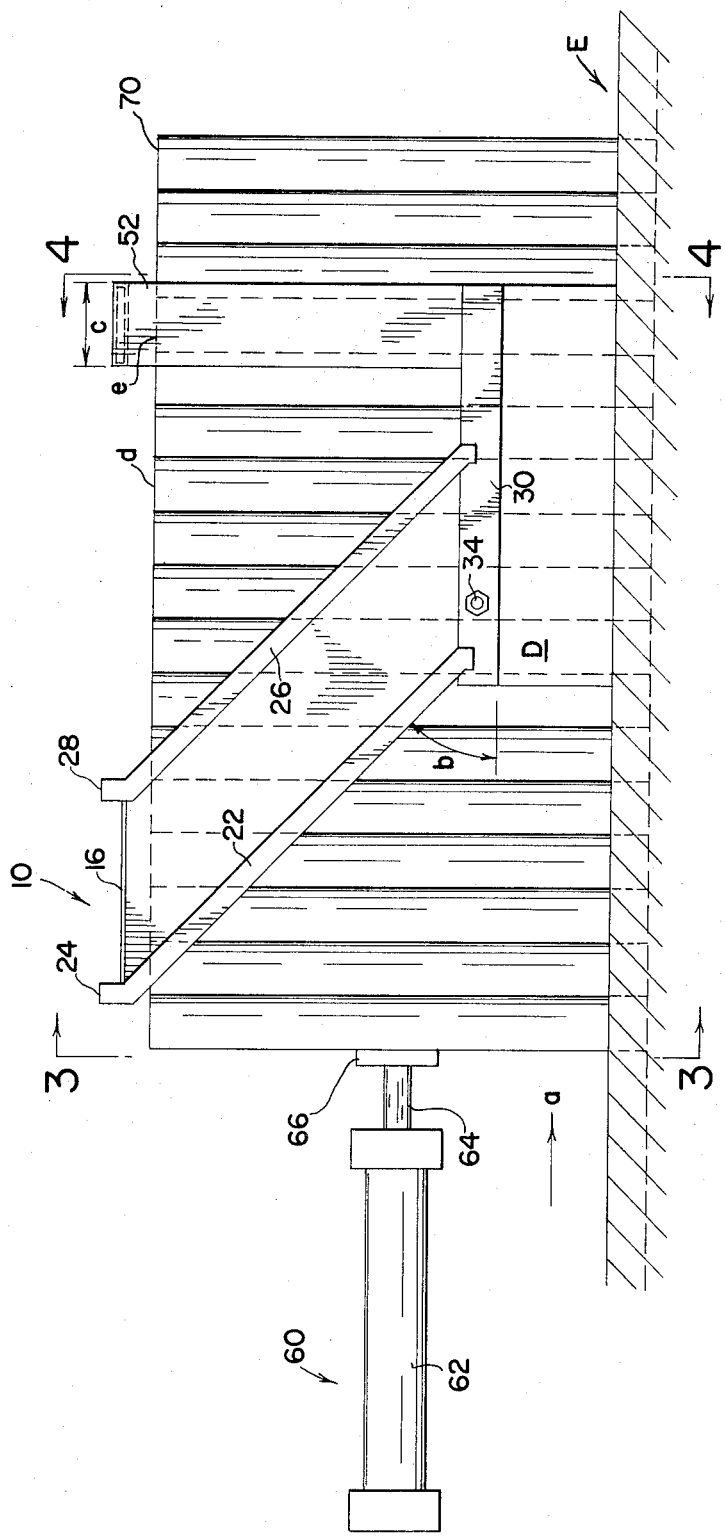

SINGLE TURN CHANNEL COIL

This application pertains to the art of heating workpieces and more particularly to inductively heating workpieces.

The invention is particularly applicable to uniformly inductively heating elongated shafts and will be described with particular reference thereto; however, it will be appreciated that the invention has broader applications and may be used for inductively heating elongated workpieces having any cross sectional configuration.

Previous apparatus utilizes for inductively heating an elongated workpiece primarily comprised means for passing the workpiece in an inductive coupling relationship longitudinally through an inductor comprised of a plurality of coils, wherein the entire length of the workpiece was heated. Certain jobs, such as for example in the manufacture of bolts, require that only a portion of the workpiece be heated while the remainder is virtually unheated. Originally, this was accomplished by merely placing the portion of the workpiece to be heated near a heat source. This approach had the inherent drawbacks of being both time consuming and yielding varying results. Further, and as this approach proved to be time consuming, it was found that by the time the portion of the workpiece which was heated reached the desired temperature, the remainder of the workpiece had also been heated by conduction.

It had been previously suggested to utilize a single turn inductor having two parallel spaced apart interconnected conductors which define a workpiece pass as shown in U.S. Pat. No. 2,620,432 to N. E. Foxx. In that patent, the conductor was angled relative to the pass so that as a workpiece was transversely directed therethrough, it would be progressively heated over at least a portion of its length. In the Foxx type of apparatus, the workpieces, after being progressively heated, were given a final heating over the entire length which had been progressively heated to bring the workpiece portion to the desired temperature. However, this final heating did not bring the workpiece to a uniform final temperature such that these were areas of different temperature therealong. This type of apparatus has proved fairly successful for some applications, but for applications where it is imperative to have the shaft exit at a uniform temperature, this single turn channel has not proved at all satisfactory. One of the reasons for the unacceptable results obtained relative to uniform heating was the design and location of the final heating area. The final heating area in Foxx did nothing more than progressively preheat or superheat the portion a second time which did not provide a uniformly heated workpiece portion. Further, in using the Foxx type apparatus, the workpieces were not centered in the final heating area such that the final heating of each workpiece is only accomplished after at least two indexing steps of a workpiece therethrough. Again, this arrangement does not permit each workpiece to be uniformly heated as the first portion of each workpiece to receive final heating is permitted to cool while the second portion of the workpiece to receive final heating is heated.

The present invention contemplates a new and improved method and apparatus which overcomes the above referred problems and others, and provides a method and apparatus for progressively heating a portion of an elongated workpiece, which apparatus is simple and assures uniform heating over at least a desired portion of the workpiece.

In accordance with one aspect of the present invention, there is provided a method for inductively heating a portion of the length of an elongated workpiece comprising the steps of:

a. passing the workpiece and a preheating conductor relative to each other so that at least a portion of the workpiece is progressively preheated;

b. passing the workpiece and a superheating conductor relative to each other so that the end portion of the workpiece is superheated;

c. Passing the workpiece and a uniforming heating conductor relative to each other so that the portion of the length of the workpiece which has been preheated is simultaneously uniformly heated to a desired temperature.

In accordance with the present invention, there is provided an inductor for uniformly heating at least a portion of the length of an elongated workpiece. The inductor comprises a pair of interconnected spaced apart conductors which define a workpiece pass having separate entrance and exit areas. These conductors are angularly disposed coplanar with the pass whereby as the workpiece is transversely directed along the pass, a portion of the element length is progressively preheated. Immediately adjacent the first pair of conductors is a pair of uniform heating conductors also coplanar with the pass and extending transverse thereto. As the workpiece is directed transversely along the pass, it is first progressively preheated by the first pair of conductors. The workpiece is then directed between the uniform heating conductors in order to bring the entire previously progressively heated portion of the workpiece to a uniform final temperature.

In accordance with a more limited aspect of the present invention, the uniform heating conductors are of a width in the range of from one to one and a half times the cross sectional dimension of the element.

The principal object of the present invention is the provision of a new and improved method and apparatus for inductively heating a portion of the length of an elongated workpiece.

Another object of the present invention is the provision of a new and improved method and apparatus for inductively heating at least a portion of an elongated workpiece to a uniform final temperature.

Yet another object of the present invention is the provision of a new and improved method and apparatus for inductively heating an elongated workpiece which is simple and economical to use.

The invention may take physical form in certain parts and arrangements of parts, a preferred embodiment of which will be described in detail in this specification and illustrated in the accompanying drawings which form a part hereof and wherein:

FIG. 2 is a side elevation of the inductor of the subject invention showing the inductor in actual operation;

Figure 1:
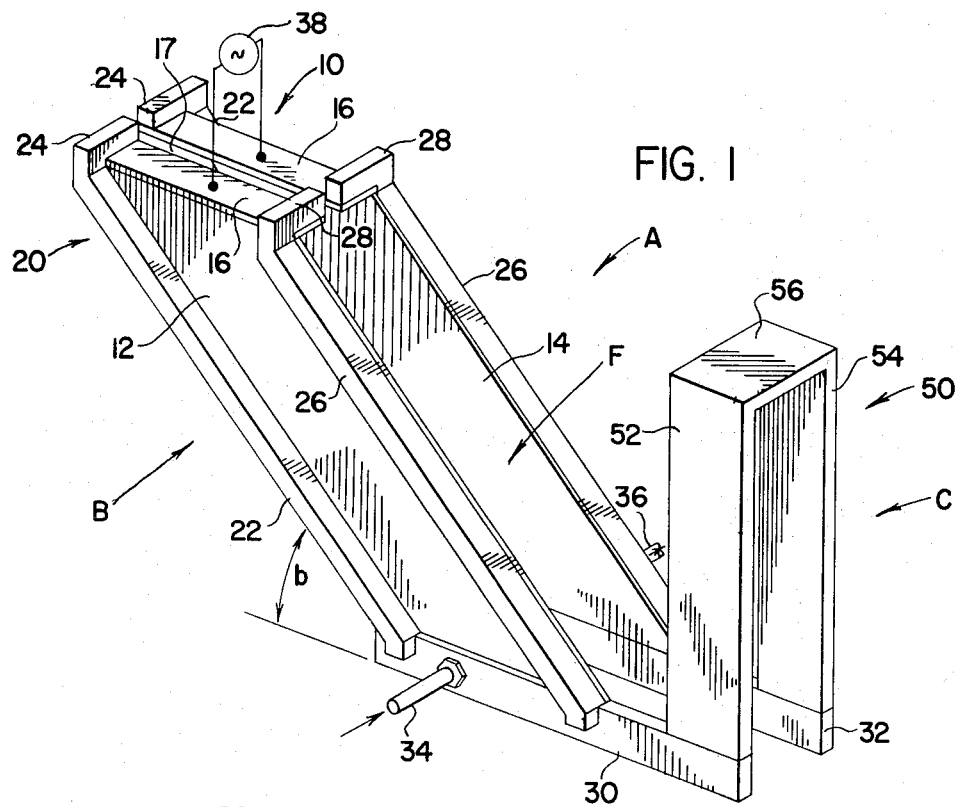
FIG. 1 is a perspective view of the inductor of the subject invention.

Referring now to the drawings wherein the showings are for the purposes of illustrating the preferred embodiment of the invention only and not for purposes of limiting same, the FIGURES show an inductor A comprised of progressive preheating area B and uniforming heating area C. Inductor A is mounted to base D which in turn is associated with workpiece support E.

Figure 3:
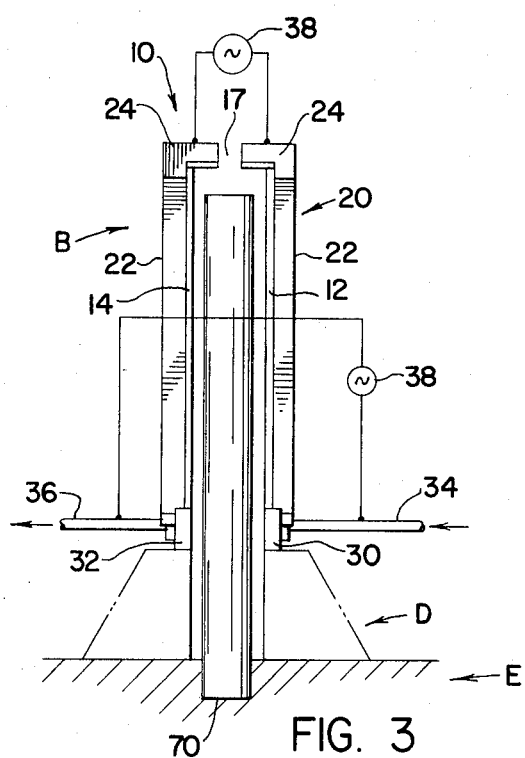
FIG. 3 is a cross sectional view taken along lines 3—3 of FIG. 2.

More specifically, specifically, preheating area B includes a preheating portion generally designated 10. Preheating portion 10 is comprised of oppositely disposed parallel and coextensive side conductors 12,14 each having a top portion 16. Top portions 16 are directed towards each other but are not in a contacting relationship, there being a gap 17 therebetween. Conductors 12,14 and members 16 are, in the preferred embodiment, constructed from ⅛-inch bus bar stock of the type generally associated with induction heating. This configuration, as best shown in FIGS. 1, 2 and 3, defines the workpiece pass F.

Extending around the outer edges of preheating portion 10 is cooling portion 20. This cooling portion is comprised of front cooling segments 22, top front cooling segments 24, rear cooling segments 26 and top rear cooling segments 28. These cooling segments may be constructed from a variety of materials, however, in the preferred embodiment, they are constructed from rectangular tubing. In the preferred embodiment, these cooling segments are brazed to their associated conductors.

The conductors and cooling segments are affixed to base members 30,32 which, in the preferred embodiment, also are constructed from rectangular tubing, so that the segments and base members may establish fluid flow paths therethrough. Base member 30 includes coolant supply inlet 34 and base member 32 includes coolant supply inlet 36, which inlets may be of any convenient type. By introducing a coolant, such as for example, water under pressure into coolant supply inlets 34,36, coolant flow paths are established through base member 30, segments 22,24, segments 26,28 and base member 32. This cooling system withdraws heat generated by operation of preheating area B in order to prevent overheating of the conductors. A high frequency electrical generator generally designated 38 is employed to supply electrical energy to the inductor as is known in the introduction heating art.

Spaced from progressive preheating area B along base members 30,32 is uniforming heating area C comprised of conductors 52,54 interconnected by the cross-over member 56, Conductors 50,52 and 54 will also be constructed from any of those materials generally associated in such constructions. Conductors 52,54 are generally coplanar with the workpiece pass established by progressive preheating area B. Of particular importance to the subject invention, is the width of the conductors comprising uniforming heating area C. It has been found that it is most advantageous to maintain this width in the range of from 1 to 1 1/2 times the cross sectional dimension of the element to be heated. The reasons for maintaining this particular relationship will be more fully described hereinbelow relative the operation of the device.

With reference to FIG. 2, it will be seen that there is provided a shaft element mover generally designated 60 which comprises a cylinder 62 having cylinder rod 64 with pusher head 66 thereon. In the preferred embodiment, cylinder 62 is a pneumatic cylinder, however, it will be understood that other types of cylinders or movers may be used without the departing from the intent or scope of the subject invention. Pusher head 66 may include a portion fitted to the particular shaft element to be heated.

Figure 4:
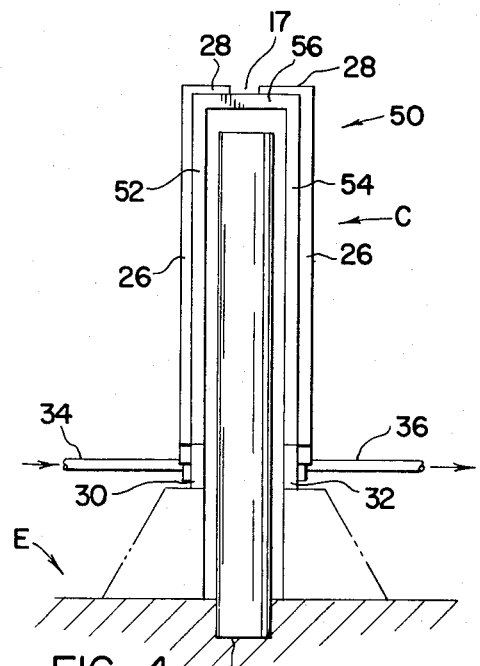
FIG. 4 is a cross sectional view taken along lines 4—4 of FIG. 2.

As best shown in FIGS. 2, 3 and 4, inductor A is mounted on base D which in turn is mounted to workpiece support E. Base D may be of several types and it is only necessary that it supports inductor A in the proper position relative to workpiece support E. Further, base D is electrically insulated from base members 30,32. Similarly, element support E may be of several types and, since it does not form a part of the present invention, is generally shown as a flat surface containing a channel area therein sufficient to receive the workpieces.

Certain relative dimensions between the inductor A components provide for best heating results. For example, it has been found that for the most efficient results, preheating portion 10 should extend angularly along the workpiece pass at an angle of preferably 45° relative thereto. This angle is shown as angle $b$ in FIGS. 1 and 2. With this particular angle, it has been found that the lateral dimension of conductors 12,14 may be approximately 3 inches and the length of base members 30,32 may be approximately 7 inches. The width of uniforming heating portion C, shown in FIG. 2 as dimension $c$, must be maintained approximately between the range of from one to one and a half times the cross sectional dimension of the workpiece being heated in order to receive the effect of the most efficient inductive heating coupling. This relationship is more fully described hereinbelow. The height of progressive preheating area B and uniforming heating area C are entirely dependent upon the amount of length of a workpiece which is desired to be heated. The width of workpiece pass F, as defined by the conductors, may vary; however, for heating an elongated workpiece having a cross sectional dimension of one inch, it has been found that a pass with a width between the range of from 1½ inches to 1¾ inches is most desirable.

The operation of the subject invention will be described with reference to a plurality of elongated shafts or bolt blanks 70 wherein it is desired to heat a certain portion of the length thereof. Each element is indexed along the element pass in the direction generally designated $a$ by element pusher or mover 60. Cylinder 62 is adjusted so that when rod 64 and pusher head 66 are moved to the extended position, they are done so in a relatively fast manner. The elements, of course, are supported in element support E so as to be properly guided relative to inductor A along the workpiece pass. As the shafts enter the pass, and with generator 38 supplying high frequency current to the preheating area, they are inductively heated as is known in the art. As these elements traverse the pass, segments on each shaft are progressively preheated until the entire desired portion of each shaft length has been so preheated. It should be noted, that as the elements traverse the pass, that portion of each element which is first preheated is first to leave the preheating area. The primary reason for this progressive type heating, is that it requires a smaller inductor size and lower power requirements to effect the desired heating. As each shaft 70 exists progressive preheating area B, as shown by position *d* in FIG. 2, it has been preheated to a temperature of approximately 1,500°F. From that position to position *e* within uniforming heating portion C, the portion of the shaft spaced directly between base members 30,32 is superheated by the action of those members.

When each shaft is indexed to position *e*, it is necessary that it be generally spaced between the uniforming heating portion as shown by position *e* in FIG. 2. This position is to be distinguished from the corresponding position in the Foxx patent. If it was placed closer to one end than the other, the element would not be uniformly heated as desired. Further, it is also necessary for proper uniform heating that element mover or pusher 60 quickly index elements 70 into and out of an inductive coupling relationship with portion C such that either the leading or trailing surface of each element does not receive extended uniform heating time, which again, would impair the receipt of uniform heating. As described, it has been found most advantageous to limit the width dimension, dimension *c*, to from between one to one and a half times the cross sectional dimension of the shafts 70 being heated. More specifically, if dimension *c* is less than the cross sectional dimension, a high flux density is generated but the shaft will not be simultaneously uniformly heated such that the leading and trailing edges of each shaft would be heated to a lower temperature than the rest of the shaft body. On the other hand, if dimension *c* exceeds the desired one and a half times the cross sectional dimension, a different problem is encountered. That is, the increase in width reduces the relative flux density generated between the conductors so that one of two alternative must be taken. First, the power supplied to the inductor must be increased which, of course, has the effect of increasing the cost of operation of the inductor unit. Secondly, the shafts could be heated for a longer period of time which has the obvious effect of reducing the overall production output of the unit. Further, if dimension *c* is greater than one and a half times the cross sectional dimension of the elements, there will be substantial heating overlap so that the adjacent shafts will be effected. This also reduces the ability to obtain uniform heating.

It has been found in using the subject invention that one inch diameter shafts 70 exiting from uniforming heating area C have been heated to a temperature in the range of 2,100°F., over a six inch length with only a plus or minus 50°F. temperature differential over that heated length. It has also been found that each shaft 70 may be processed through inductor A in approximately 25 seconds.

The invention has been described with references to the preferred embodiment. Obviously modifications and alterations will occur to others upon the reading and understanding of this specification. It is my intention to include all such modifications and alterations insofar as they come within the scope of the appended claims or the equivalence thereof.

Having thus described my invention, I now claim:

1. In a single turn inductor of the type particularly useful for inductively heating at least a portion of the length of an elongated workpiece wherein said inductor includes first and second spaced apart interconnected conductors defining a workpiece pass having entrance and exit areas, said first and second conductors being angularly disposed relative to said pass to progressively heat said workpiece, the improvement comprising:

a single turn inductive heating conductor interconnected with said first and second conductors and spaced adjacent thereto from said exit area for uniformly heating said portion, said single turn heating conductor comprising third and fourth interconnected conductors spaced apart from said first and second conductors along said pass and extending transverse to and coplanar with said pass to simultaneously uniformly heat said at least one portion, said third and fourth conductors having a width in the range of between one and one-half times the cross sectional dimension of said workpiece.

2. An inductor for uniformly heating at least a portion of the length of an elongated workpiece, said inductor comprising:

first and second interconnected spaced apart conductors defining a workpiece pass having separate entrance and exist areas, said first and second conductors being angularly disposed coplanar with said pass, whereby as said workpiece is directed along said pass, said at least a portion of said workpiece length is progressively preheated;

third and fourth interconnected heating conductors spaced along said pass at said exit area from said first and second conductors coplanar with and transverse to said pass, whereby as said workpiece is directed along said pass, said portion is simultaneously uniformly heated to a desired temperature;

means disposed along said pass between said first and second and said third and fourth conductors for further heating a segment of said portion;

means for supplying high frequency electrical energy to said conductors; and, means for moving said workpiece along said pass and at least from a first position therealong immediately adjacent said third and fourth conductors to a second position therealong spaced directly between said third and fourth conductors.

3. The inductor as defined in claim 2 wherein the width of said third and fourth conductors along said pass is at least equal to the cross sectional dimension of said workpiece.

4. The inductor as defined in claim 3 wherein the width of said third and fourth conductors along said pass is in the range of from one to one and a half times the cross sectional dimension of said workpiece.

5. The inductor as defined in claim 2 wherein said first and second conductors extend diagonally along said pass at an angle of approximately 45° therewith.

6. In a single turn inductor of the type particularly useful for inductively heating at least a portion of the length of an elongated workpiece wherein said inductor includes first and second spaced apart interconnected conductors defining a workpiece pass entrance and exit areas, said first and second conductors being angularly disposed relative to said pass to progressively heat said workpiece, the improvement comprising:

a single turn inductive heating conductor interconnected with said first and second conductors and disposed adjacent thereto from said exit area for uniformly heating said portion, said single turn heating conductor comprising third and fourth interconnected conductors each having a constant width at least equal to the cross sectional dimension of said workpiece, said third and fourth conductors extending transverse to and coplanar to said pass to simultaneously uniformly heat said at least one portion; and, means disposed along said pass between said first and second and said third and fourth conductors for further heating a segment of said portion.

7. The improvement as defined in claim 6 further including means for moving said workpiece progressively along said pass and at least from a first position therealong immediately adjacent said third and fourth conductors to a second position therealong directly between said third and fourth conductors, whereby all of said portion is simultaneously heated.

* * * * *